No. 675,387. Patented June 4, 1901.
R. M. KEATING.
MOTOR BICYCLE.
(Application filed June 18, 1900.)
(No Model.)
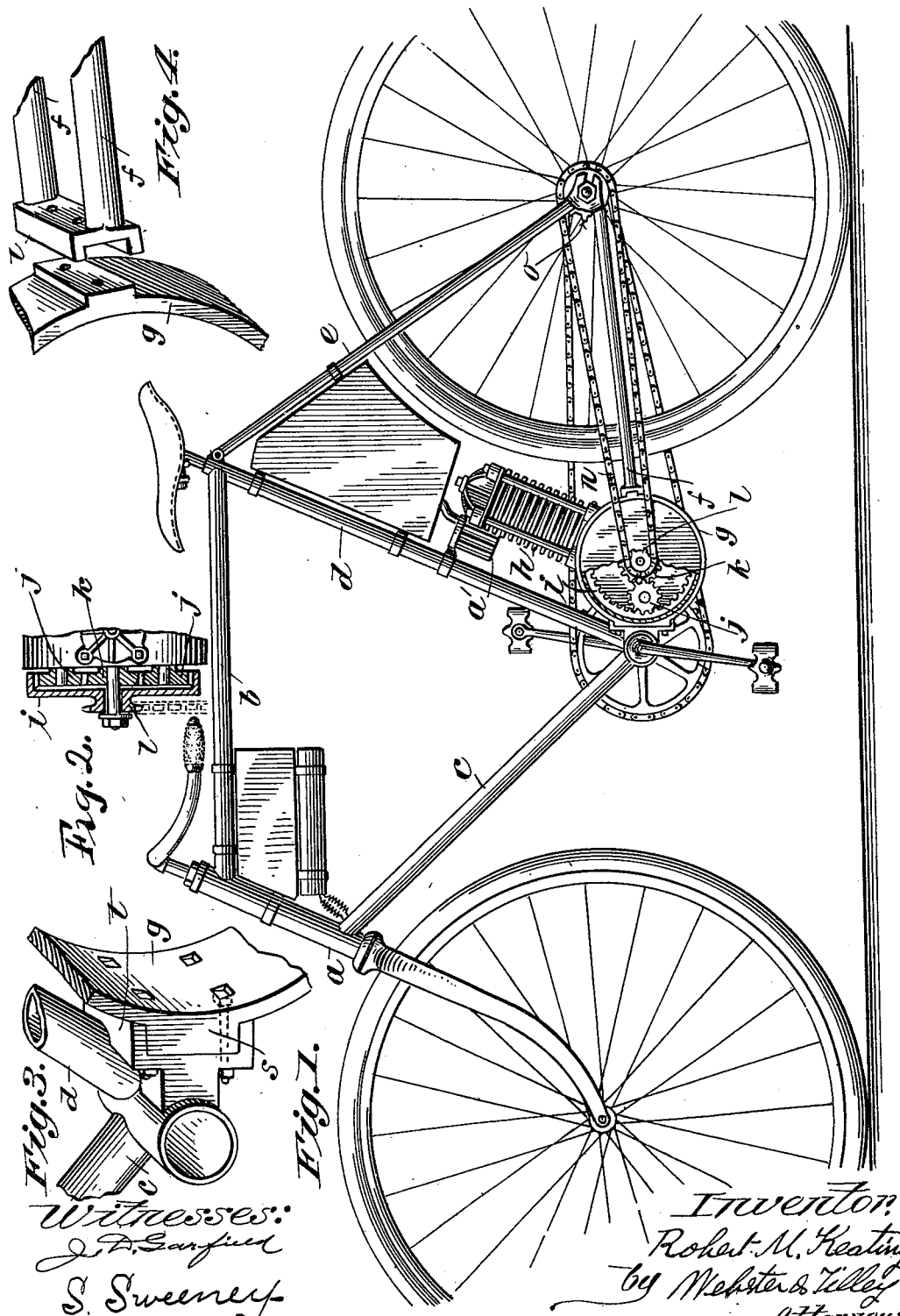

UNITED STATES PATENT OFFICE.

ROBERT M. KEATING, OF MIDDLETOWN, CONNECTICUT, ASSIGNOR TO R. M. KEATING MOTOR COMPANY, OF PORTLAND, MAINE.

MOTOR-BICYCLE.

SPECIFICATION forming part of Letters Patent No. 675,387, dated June 4, 1901.

Application filed June 18, 1900. Serial No. 20,632. (No model.)

*To all whom it may concern:*

Be it known that I, ROBERT M. KEATING, a citizen of the United States of America, residing at Middletown, in the county of Middlesex and State of Connecticut, have invented new and useful Improvements in Motor-Bicycles, of which the following is a specification, reference being had to the accompanying drawings and letters of reference marked thereon.
The object of my invention is to provide a motor-bicycle which shall be light, strong, and serviceable.

In the accompanying drawings, in which like letters of reference indicate like parts, Figure 1 is a side view of a bicycle constructed in accordance with my invention. Fig. 2 is an edge view of the reducing-gear mechanism. Fig. 3 is a perspective view of a crank-hanger bracket attached to a section of the motor-casing; and Fig. 4 is a like view of a portion of the lower horizontal bars and a section of the casing, illustrating their relative positions.

In detail, $a$ indicates the head; $b$, the top bar; $c$, the lower front bar; $d$, the saddle-post bar; $e$, the rear upper bars; $f$, the rear lower bars; $g$, a shell or casing adapted to support the motor and having within it a portion of the motor and the reducing-gearing;
$h$, motor-cylinder; $i$, an internal gear; $j$, intermediate gears; $k$, crank-shaft gear; $l$, driving sprocket-wheel; $m$, fuel-reservoir; $n$, driving sprocket-chain; $o$, rear-wheel driven sprocket.
In the construction of my device a bicycle-frame of the ordinary type may be employed, excepting that suitable provision is made for supporting the engine or gear casing adjacent and behind the saddle-post bar and by preference so as to bring the driving-chain approximately in line with the lower rear bars.

The motor may consist of any suitable type adapted for the purpose, and I prefer to make the casing $g$ a connecting-link between the lower bars $f$ and the crank-hanger bracket, thus suspending the motor in the most desirable position and giving to the frame the requisite strength, lightness, and rigidity.

As the speed of a gas or explosion type of motor is too rapid when converted into a rotary motion to be applied directly to the driving-wheel of a bicycle, I employ a system of reducing-gearing, thus reducing the number of revolutions per minute and as a result increasing the power applied to the driving-wheel. To accomplish this result, the motor crank-shaft is mounted in suitable bearings and has mounted upon it a gear $k$, which gear meshes with two intermediate gears $j$, and the gears $j$ in turn mesh with an internal gear $i$, the latter having mounted upon it a crank-shaft sprocket-wheel $l$, from which sprocket-wheel a sprocket-chain $n$ extends to a rear sprocket-wheel $o$, the latter sprocket-wheel being mounted upon a mechanism known as a "coaster-brake construction," which mechanism is so constructed that the sprocket-wheel $o$ may be locked or unlocked by the rotations of the sprocket-wheel, which is controlled by the pedals, so that if the motion of the pedals is forwardly the sprocket-wheel $o$ driven by the motor will be locked to the shaft or hub of the driving-wheel of the bicycle, and thus the bicycle will be carried forwardly by the motion of the motor through the medium of the sprocket-chain $n$. When, however, the pedals are rotated in a reverse direction, this operates to unlock or disengage the locking mechanism in the coaster-brake, leaving the sprocket-wheel $o$ free to revolve independently, so that the motor may continue in motion while the bicycle remains at rest. Such pedal connections to the driving-wheel hub are common and well known in bicycle construction. With this construction, it will be observed, the application of the power of the motor to drive the bicycle is controlled by the pedals. The reservoir $m$ for gasolene, naphtha, &c., is preferably located below the seat and just behind the saddle-post bar, and I prefer to arrange the battery and spark-coil adjacent to the head $a$ and immediately below the upper bar $b$, carrying the wires by preference down through the lower bar $c$.

The casing $g$ is of circular form and sufficiently strong to support the motor and gearing and any weight to which it may be subjected. This casing is preferably attached as illustrated in Figs. 3 and 4 of the drawings, wherein, as shown, the casing is provided with projecting parts or lugs, and the parts attached thereto are provided with engaging sockets or clamp plates or parts *t*, which overlap the lugs *s*, thus giving to the joints the requisite strength and rigidity. The lugs *s* project from the casing *g* in the form of polygonal blocks, being in transverse direction of the frame of the machine. The sockets *t* have their ledges in corresponding direction and are open at their ends. The parts can thus be assembled or taken apart at either side and when assembled are firmly held by bolts *v*, the bolt-heads and some of the nuts being shown in Fig. 3. The motor can thus be removed for repairs, being also very compact with the frame. The motor is mounted, as before stated, upon the casing *g*, which casing has suitable openings through its top portion for the operation of piston-rod and pitman, or these parts may operate upon a crank arranged at one side instead of in the center line of the shell or casing *g*.

The top rear bars *e* are detachably secured to the seat-post bracket, and the lower bars *f* are detachably secured at their forward ends either to the shell *g* or to the crank-hanger bracket. This is a desirable feature in motor-bicycle construction, as the rear portion of the frame may be easily detached from the remainder of the frame and the motor mechanism and other parts be easily gotten at for purposes of adjustment, repair, &c.

While I deem the construction illustrated showing the shell or casing *g* located between the ends of the bars *f* and the crank-hanger bracket the best, it will readily be seen that the casing may be arranged between the bars *f* and they be arranged, as is common, extending from the rear bracket to the crank-hanger bracket.

Having therefore described my invention, what I claim, and desire to secure by Letters Patent, is—

1. In a motor-bicycle, the frame having open-ended sockets projecting from the crank-hanger and rear lower bars respectively, and a motor-casing having lugs to fit such sockets, the casing thus forming an extension of the lower rear bars, and being removable from the side of the frame, substantially as described.

2. In a motor-cycle, the combination of the bracket-hanger at bottom of the seat-post, a clamping-socket formed on and extending to the rear of said hanger, a cylindrical motor-casing having a forwardly-projecting lug entering said socket and bolted thereto, the rear lower bars connected to said motor-casing and to the rear bearings, and the rear upper bars detachably connected to the seat-post, substantially as described.

3. In a motor-bicycle, the combination, in the frame, of the head, upper and lower front bars and a generally upright seat-post, said seat-post and lower front bar connected to a pedal-bracket, the engine-casing in rear of said pedal-bracket and connected to the seat-post, the rear lower bars connected to the engine-casing and to the wheel-forks, and suitable upper rear bars, all combined substantially as described.

ROBERT M. KEATING.

Witnesses:
ALLEN WEBSTER,
S. SWEENEY.